United States Patent [19]

Morrow et al.

[11] 4,354,606

[45] Oct. 19, 1982

[54] BEARING ASSEMBLY FOR A PEDESTAL CRANE

[76] Inventors: William D. Morrow; William R. Bath, both of 6116 Cunningham, Houston, Tex. 77041

[21] Appl. No.: 131,751

[22] Filed: Mar. 19, 1980

[51] Int. Cl.[3] .............................................. F16C 17/06

[52] U.S. Cl. .................................... 212/175; 212/253; 308/73

[58] Field of Search ........................... 212/175, 179, 253; 308/73, 74, 238, DIG. 8

[56] References Cited

U.S. PATENT DOCUMENTS 3,711,169 1/1973 Gardner ................................ 308/73

4,061,230 12/1977 Goss et al. .......................... 212/179

4,184,600 1/1980 Goss et al. ...................... 212/175 X

*Primary Examiner*—Robert G. Sheridan

*Attorney, Agent, or Firm*—Pravel, Gambrell, Hewitt, Kirk & Kimball

[57] ABSTRACT

A bearing assembly for a pedestal crane including at least one arcuate shoe adapted to be disposed about the pedestal and mounted with the upperworks of the pedestal crane, with mounting members for releasably mounting the arcuate shoe with the upperworks of the pedestal crane, and further having bearing means with the arcuate shoe for engaging the outer surface of the pedestal for reducing friction between the upperworks and the pedestal when rotating the upperworks of the pedestal crane about the pedestal.

5 Claims, 4 Drawing Figures

BEARING ASSEMBLY FOR A PEDESTAL CRANE

TECHNICAL FIELD

The field of this invention is pedestal crane bearing systems, particularly of the type providing bearing surfaces between the upperworks of the pedestal crane assembly and the pedestal.

DESCRIPTION OF THE PRIOR ART

Prior art crane bearing systems of the type utilized in pedestal cranes, have in the past utilized a variety of types of bearing assemblies to prevent excessive wear between the upperworks of the crane assembly as it rotates about the pedestal of a crane. As shown in U.S. Pat. No. 4,061,230, a bearing structure is shown having a plurality of sets of rollers adapted to be mounted with the upperworks for rotatably engaging the pedestal to permit rotation of the upperworks about the pedestal itself. In U.S. Pat. No. 4,184,600, a bearing material is adapted to be mounted with and in an annular groove formed in the pedestal. Such bearing material is adapted to be removed from the pedestal and discarded upon excessive wear thereof. In the replacement process of the bearing material, the pedestal crane is moved vertically above the bearing assembly to allow access to and removal of such bearing material. However, after replacement of the bearing material, the upperworks of the pedestal crane is lowered down about the bearing material, which typically engages and damages the new bearing material as the upperworks is lowered.

SUMMARY OF THE INVENTION

The present invention relates to a new and improved bearing assembly for a pedestal crane which includes at least one arcuate shoe adapted to be disposed about the pedestal and releasably mounted with the upperworks of the pedestal crane and having bearing means with the arcuate shoe for engaging the outer surface of the pedestal for reducing friction between the upperworks and the pedestal when rotating the upperworks of the pedestal crane about the pedestal.

DESCRIPTION OF THE PREFERRED EMBODIMENT

Figure 1:
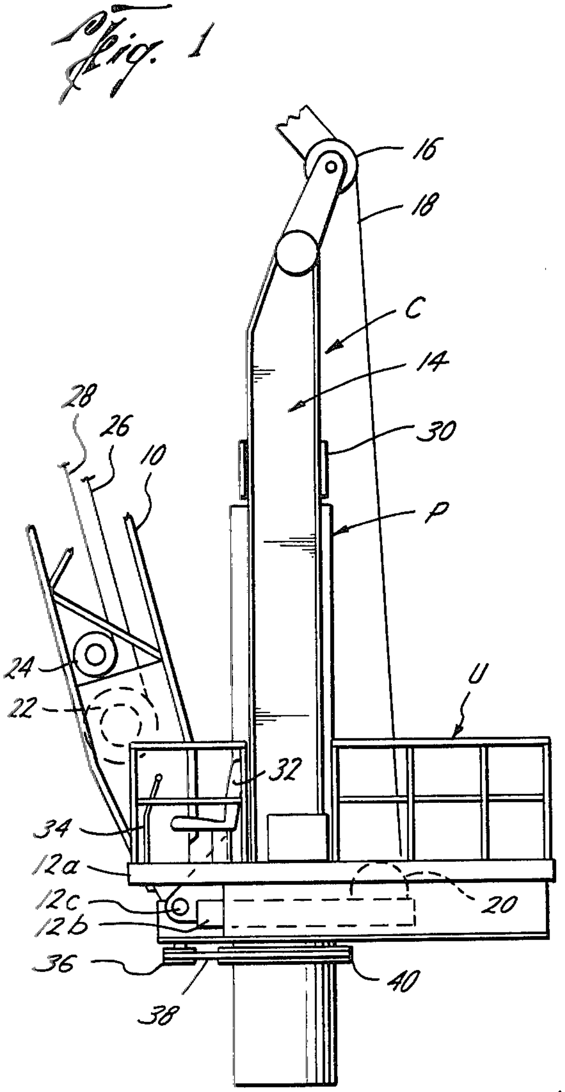
FIG. 1 is an elevational view of a portion of a pedestal crane assembly as disposed about a pedestal.
Figure 2:
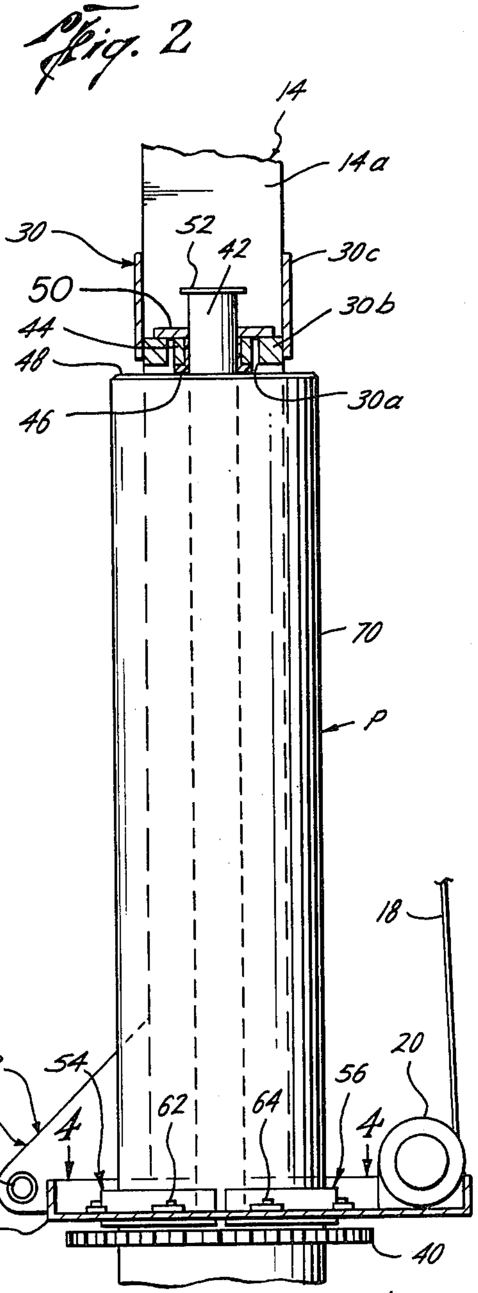
FIG. 2 is an elevational, sectional view of the pedestal and a portion of the pedestal crane assembly, showing the mounting of the bearing assembly of the present invention with the upperworks in relation to the pedestal crane assembly and the pedestal.

In the drawings, the letter B designates the bearing assembly of the present invention. The bearing assembly B is adapted to be removably mounted with the upperworks U of the pedestal crane C and about the pedestal P for providing appropriate bearing action therebetween. Unless otherwise noted, the components of this invention are made of steel, capable of taking heavy stresses and strains without failure, although other suitable high strength materials may be used if desired.

As shown in FIG. 1, the bearing assembly B of the present invention is adapted to be used with a pedestal crane C. The pedestal crane C generally includes a boom 10 movably affixed to the upperworks U. The upperworks U includes upperworks section 12 which is adapted to be disposed about the pedestal P. The pedestal P may be mounted with an offshore platform, permanently embedded in the ground, mounted with a movable vehicular frame or in any other way rigidly affixed to a supporting structure (not shown). The upperworks section 12 generally includes a platform **12*a* and a base member 12*b* adapted to be disposed about the pedestal P. The boom 10 is preferably pivotally affixed with the upperworks section 12 adjacent pin joint 12*c*. Parallel I-beam such as I-beams 14 are affixed with the platform 12*a* and extend upwardly therefrom for providing support for sheave 16. Sheave 16 receives boom hoist line 18 from boom hoist 20 which is preferably mounted with the base member 12*b* of upperworks section 12 of upperworks U. The boom hoist 20 controls the angle of inclination of the boom 10** as is known.

Preferably the main hoist 22 is mounted with the boom 10 as is auxiliary hoist 24. This permits the main hoist line 26 and auxiliary hoist line 28 to run along the length of and within the boom 10 to prevent "two-blocking" problems known in the industry. The I-beams 14 are affixed to the platform **12*a* of the upperworks section 12, with such I-beams 14 extending upwardly therefrom and being attached together adjacent a revolving turntable 30 which is adapted to be affixed between internal webs 14*a* of the I-beams 14. Preferably, the upperworks section 12 is of a substantially circular configuration which permits the greatest amount of working area utilizing the minimum amount of swing-space. The upperworks section 12 preferably includes an operator's chair 32 mounted on the platform 12*a* having controls 34 adjacent thereto. Also, preferably positioned on the platform 12*a* is an appropriate motive power source (not shown) capable of providing mechanical, fluid or electric power as desired. The motive power may include a diesel engine or the like which provides suitable power for powering the boom hoist 20, main hoist 22 and/or auxiliary hoist 24 in addition to drive 36. A chain 38 engages drive 36 and gears 40 affixed to the outer surface 70 of the pedestal P provides for rotational movement of the upperworks section 12** about the pedestal P as desired.

The pedestal crane C is primarily adapted to be disposed about pedestal P, with the revolving turntable 30 adapted to be disposed about a support column 42 mounted with the pedestal P. The revolving turntable 30 is preferably formed having an opening **30*a* formed in base support 30*b*. The base support 30*b* is in turn affixed with the side support 30*c* thereof. The opening 30*a* in the turntable 30 is preferably of a rectangular configuration and is adapted to receive radial bearing 44 therein. A thrust bearing 46 is adapted to be disposed between the radial bearing 44 and the upper end 48 of the pedestal P. A retainer plate 50 is secured both to the turntable 30 by suitable fasteners (not shown) and to the radial bearing 44 by suitable fasteners (not shown). A stop plate 52 is secured to the support column 42 by appropriate fasteners (not shown). Additional structure of the pedestal crane C is disclosed more fully in U.S. Pat. No. 4,184,600, which provides a more detailed consideration of the radial bearing 44, thrust bearing 46 combination and effects thereof. It is intended that the pedestal crane C of the instant application operate in accordance with the teachings of U.S. Pat. No. 4,184,600 as it pertains to the structure in proximity to the support column 42, radial bearing 44 and thrust bearing 46**.

Figure 3:
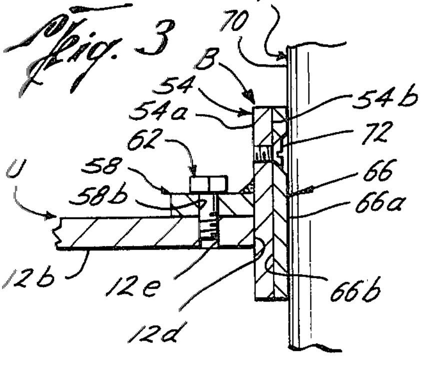
FIG. 3 is an enlarged elevational, sectional view showing the bearing assembly of the present invention as affixed to the upperworks of the pedestal crane; and, FIG. 4 is a plan view, partially in section showing the bearing assembly of the present invention, taken along the lines 4—4 of FIG. 2.
Figure 4:
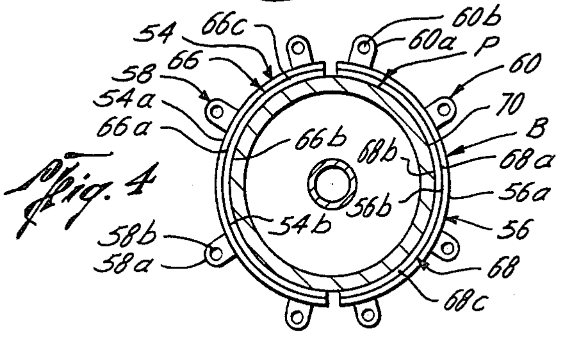

As best seen in FIG. 3, the base member 12*b* of the upperworks U is formed having a central opening 12*d* therein for receiving the pedestal P therethrough. The bearing assembly B of the present invention is adapted to be mounted with the base member 12*b* of upperworks section 12 of upperworks U. The bearing assembly B includes arcuate shoes 54, 56 which are adapted to be disposed about the pedestal P. The arcuate shoes 54, 56 each have a respective outer shoe surface 54*a*, 56*a* and an inner shoe surface 54*b*, 56*b*, respectively. Mounting means designated generally as 58, 60 are with the arcuate shoes 54, 56, respectively for releasably mounting the arcuate shoes 54, 56 with the upperworks U. Preferably, the mounting means 58, 60 includes a plurality of mounting flanges such as mounting flanges 58*a*, 60*a*, with each of such flanges being formed having suitable vertical openings 58*b*, 60*b* therein. Suitable fasteners 62, 64 are adapted to be inserted through the openings 58*b*, 60*b* and be received in similar openings such as opening 12*e* (FIG. 3) formed in the upperworks section 12. These fasteners 62, 64 may be of any suitable type such as a threaded bolt, bolt-nut combination or any other suitable means for releasably affixing the arcuate shoes 54, 56 with the upperworks U.

The bearing assembly B of the present invention further includes bearing means designated generally as 66, 68 with the inner shoe surfaces 54*b*, 56*b* of the arcuate shoes 54, 56, respectively for engaging the outer surface 70 of the pedestal P for reducing friction between the upperworks U and the pedestal P when rotating the upperworks U of the pedestal crane C about the pedestal P. Preferably, the bearing means 66, 68 includes an inner surface 66*a*, 68*a* and an outer surface 66*b*, 68*b*, respectively. Preferably, the bearing means 66, 68 is secured with the arcuate shoes 54, 56 by any means which may include suitable fasteners such as fastener 72 (FIG. 3) which extends through the bearing means 66 and thereinto arcuate shoe 54 for releasably affixing the bearing means 66 therewith. A plurality of such fasteners may be used for securing such bearing means 66, 68 with the arcuate shoes 54, 56. Alternatively, the bearing means 66, 68 may be bonded, glued or in any other suitable fashion affixed to the arcuate shoes 54, 56. It is preferred that the bearing means 66, 68 be formed in the shape of an arcuate pad as pads 66*c*, 68*c* with the outer surfaces 66*b*, 68*b* of the bearing means 66, 68 engaging the inner shoe surfaces 54*b*, 56*b* of the arcuate shoes 54, 56, respectively. The inner surfaces 66*a*, 68*a* of the bearing means 66, 68 is adapted to be in engagement with the outer surface 70 of the pedestal P for reducing friction between the upperworks U and the pedestal P when rotating the upperworks U of the pedestal crane C about the pedestal P. Thus, the bearing pads 66*c*, 68*c* of the bearing means 66, 68 are removably mounted with the arcuate shoes 54, 56, respectively. It is preferred that the bearing means 66, 68 be formed of a suitable ultra high molecular weight polyolefin or any other suitable bearing material capable of taking the loads incumbent operation of such a pedestal crane C while reducing friction between such moving parts.

As best seen in FIG. 3, when mounting the bearing assembly B of the present invention with the upperworks U, it is preferred that the outer shoe surface such as outer shoe surface 54*a* of the arcuate shoe 54 abut the central opening 12*d* formed in the upperworks section 12 of the upperworks U while the inner surface such as inner surface 66*a* of the bearing means 66, is in engagement with the outer surface 70 of the pedestal P. Furthermore, it is preferred that the arcuate shoes 54, 56 be of substantially 180° such that two of such arcuate shoes 54, 56 substantially completely surround the pedestal P when mounted with the upperworks U.

In the use or operation of the bearing assembly of the present invention with a pedestal crane C, it will be appreciated that the bearing assembly B may be easily removed and replaced. In contradistinction to the teachings of U.S. Pat. No. 4,184,600, the bearing assembly of the present invention does not require that the upperworks U of the pedestal crane C be elevated to effectuate removal of the bearing assembly B. Furthermore, the bearing assembly B of the present invention may be exchanged or rebuilt without requiring removal of the power chain 38. In order to appropriately change out the bearing assembly B of the present invention, the upperworks U need only be centered about the pedestal P in a manner taught in U.S. Pat. No. 4,184,600. The fasteners 62, 64 may be thereafter removed from the mounting means 58, 60, respectively and thereafter the arcuate shoes 54, 56 having the bearing means 66, 68 therewith, be removed from the central opening 12*d* in the upperworks section 12 of the pedestal crane C. Thereafter a replacement bearing assembly B may simply be installed with the outer shoe surfaces 54*a*, 56*a* of replacement arcuate shoes 54, 56 being disposed within the central opening 12*d* in the upperworks section 12 in an abutting relationship. The fasteners 62, 64 thereafter are reinserted through the mounting means 58, 60 to appropriately mount the arcuate shoes 54, 56 of the bearing assembly B with the upperworks U such that the inner surfaces 66*a*, 68*a* of the bearing means 66, 68 directly engages the outer surface 70 of the pedestal P to provide the appropriate bearing action therebetween.

It will be appreciated that further in contradistinction to the raising and lowering action necessary and taught in U.S. Pat. No. 4,184,600, no such action is necessary, thus protecting the integrity of the bearing means 66, 68 which is subject to damage upon improper raising and/or lowering of the upperworks U particularly in an off-center fashion about the pedestal P. Thus, the removable bearing assembly B of the present invention provides a new and improved assembly for a pedestal crane C.

The foregoing disclosure and description of the invention are illustrative and explanatory thereof, and various changes in the size, shape and materials as well as in the details of the illustrated construction may be made without departing from the spirit of the invention.

We claim:

1. In a pedestal crane having upperworks formed with a central opening thereof for receiving a pedestal therein, a bearing assembly comprising:

two arcuate shoes adapted to be disposed about the pedestal, each of said arcuate shoes having an outer shoe surface and an inner shoe surface, said outer shoe surface engaging the central opening in the upperworks;

a plurality of mounting flanges formed with said outer shoe surface of each of said arcuate shoes for releasably mounting said arcuate shoes with the upperworks; and, bearing means affixed to and in full engagement with said inner shoe surface of each of said arcuate shoes for engaging the outer surface of the pedestal for reducing friction between the upperworks and the pedestal when rotating the upperworks of the pedestal crane about the pedestal.

2. The bearing assembly of claim 1, wherein said bearing means is removably mounted with said arcuate shoe.

3. The bearing assembly of claim 1, wherein said bearing means includes a bearing pad mounted with said arcuate shoe.

4. The bearing assembly of claim 3, wherein said bearing pad is formed of a ultra high molecular weight polyolefin.

5. The bearing assembly of claim 1, further including: each of said arcuate shoes being of a substantially 180° arc.

* * * * *